(12) United States Patent
Schoberth

(10) Patent No.: US 9,751,786 B2
(45) Date of Patent: Sep. 5, 2017

(54) FIXED BED FOR AEROBIC OR ANAEROBIC WASTEWATER PURIFICATION

(75) Inventor: Edgar Schoberth, Kulmbach (DE)

(73) Assignee: B+M TEXTIL GMBH & CO. KG, Sehmatal-Cranzahl (DE)

( * ) Notice: Subject to any disclaimer, the term of this patent is extended or adjusted under 35 U.S.C. 154(b) by 708 days.

(21) Appl. No.: 14/344,362

(22) PCT Filed: Sep. 10, 2012

(86) PCT No.: PCT/DE2012/000900
§ 371 (c)(1),
(2), (4) Date: Sep. 26, 2014

(87) PCT Pub. No.: WO2013/037347
PCT Pub. Date: Mar. 21, 2013

(65) Prior Publication Data
US 2015/0048013 A1      Feb. 19, 2015

(30) Foreign Application Priority Data
Sep. 13, 2011   (DE) .................... 20 2011 051 279 U

(51) Int. Cl.
*C02F 3/10*      (2006.01)

(52) U.S. Cl.
CPC .............. *C02F 3/103* (2013.01); *C02F 3/101* (2013.01); *C02F 2201/007* (2013.01); *C02F 2203/006* (2013.01); *Y02W 10/15* (2015.05)

(58) Field of Classification Search
CPC .. C02F 3/103; C02F 3/101; C02F 3/06; C02F 3/10; C02F 3/04; C02F 3/30; B01D 2239/0654; Y10S 261/72

USPC ........ 210/615, 150, 521, 122.1; 261/DIG. 27
See application file for complete search history.

(56) References Cited

U.S. PATENT DOCUMENTS

| 4,422,930 A | 12/1983 | Hatanaka |
| 5,183,232 A | 2/1993 | Gale |
| 2005/0269262 A1 | 12/2005 | McBride |
| 2008/0053898 A1 | 3/2008 | Durda et al. |

FOREIGN PATENT DOCUMENTS

| DE | 3607520 A1 | 10/1986 |
| DE | 3816285 A1 | 11/1989 |
| DE | 9316476.9 | 2/1994 |
| DE | 4233121 A1 | 4/1994 |
| DE | 4125315 C2 | 9/1995 |

(Continued)

*Primary Examiner* — Claire Norris
(74) *Attorney, Agent, or Firm* — Michael J. Brown

(57) ABSTRACT

The invention relates to a fixed bed for aerobic or anaerobic wastewater purification, comprising an upper frame having support elements fixed to opposite side rails and/or intermediate rails for attaching textile, foldable, non-degradable supports for microorganism, a lower frame having support elements for fixing the textile supports to the lower frame, and means connecting the frames at a corner region. The invention is a fixed bed where all parts of the fixed bed can be assembled to form a relatively small packaging unit that already contains the inserted textiles. Frames are provided with spacers at least in the corner regions, the height of which spacers corresponds to the material height of the folded supports between two frames and the supports are fixed by means of the supports members to the side rails and/or intermediate rails of the frames in a preassembly step before folding.

23 Claims, 3 Drawing Sheets

(56) References Cited

FOREIGN PATENT DOCUMENTS

Figure 1:
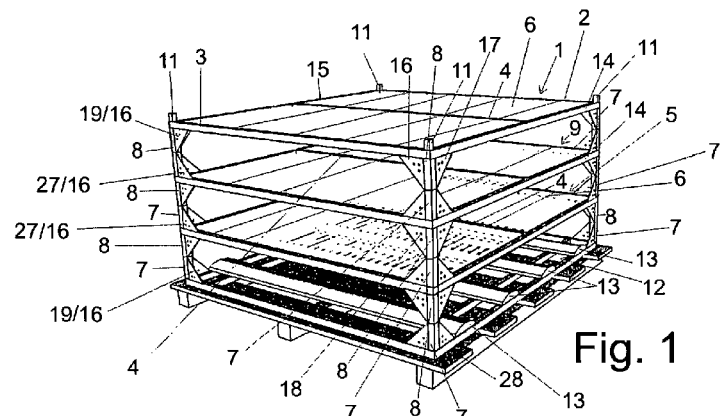

| | | |
|---|---|---|
| DE | 29521504 U1 | 6/1997 |
| DE | 19753707 A1 | 7/1999 |
| DE | 19512965 C2 | 8/1999 |
| DE | 19947517 A1 | 4/2001 |
| DE | 19730839 C2 | 7/2001 |
| DE | 10132546 C1 | 6/2003 |
| DE | 20314639 U1 | 1/2004 |
| DE | 10343743 B4 | 12/2006 |
| DE | 60126356 T2 | 11/2007 |
| EP | 0159535 B1 | 7/1988 |
| EP | 0164508 B1 | 11/1988 |
| EP | 1088793 A1 | 4/2001 |

FIXED BED FOR AEROBIC OR ANAEROBIC WASTEWATER PURIFICATION

The invention relates to a fixed bed for aerobic or anaerobic wastewater purification, at least comprising an upper frame having support elements fixed to opposite side rails and/or intermediate rails for fastening textile, foldable, non-degradable supports for microorganisms, a lower frame having support elements for fixing the textile supports to the lower frame, and means of interconnecting and spacing the frames relative to each other.

A fixed bed of the generic type is known from DE 103 43 743 B4 and comprises at least:
upper bearer rails and/or suspension cables fixed to two opposite supports or walls, for fastening:
support yarns, ropes or individual monofilament fibres of non-degradable material, on which plastics colonisation bodies for microorganisms are arranged in series, or
textile, strip-like or cord-like colonisation strips or similar having catalytic material or
textile broadcloths, which form a basic support structure for interwoven strips, cords and/or fields with colonisation zones or similar having catalytic material.

The known fixed bed is characterised in that at least one pipe and/or tube, which is arranged vertically in the fixed bed and is closed, closable or connectable to other pipes at the bottom, is provided with radial outlets and in that at least one connection is provided on the upper side on the pipe or tube for introducing gaseous and/or liquid additives, the fixed bed having a self-supporting framework of at least three corner columns, at least one of which is a hollow column, which forms at least one vertical pipe and has radial outlets at least in the direction of the space delimited by the corner columns, in which space the support yarns, ropes, fibres, textile colonisation strips or broadcloth are arranged, said corner columns being interconnected at least on the upper side via connecting rails, which simultaneously constitute the supports for the holding bars and/or suspension cables, and the fixed bed being arranged at a spacing from the bottom of the container and standing on columnar legs or extended portions of the column. This structural arrangement improves the feed of gaseous or liquid substances and allows simple sampling if necessary. It also allows a simple modular construction of the fixed bed and of a unit to be equipped with said bed.

A textile material as a support material for colonisation with microorganisms or as a catalytic material for aerobic or anaerobic wastewater purification, which can be suspended in a tank filled with the wastewater for treatment, is known from DE 41 25 315 C1. The material is a textile broadcloth which comprises strip-like colonisation strips or strips made of catalytic material and stabilising spacer strips, which are arranged next to each other or interconnected and have fastening lugs at the top and are e.g. fastened or weighted down at the bottom. The arrangement in a wastewater tank is designated as a fixed bed.

DE 195 12 965 describes a bioreactor for the biological treatment of contaminated wastewater, in particular oil-contaminated wastewater, comprising support elements for microorganisms arranged in a reactor tank and comprising aeration openings arranged underneath the support elements, the support elements being designed as strand-like mesh tubes and being suspended on a mount in the reactor tank so that they can move freely relative to each other, and a packing with a large surface area being arranged in the mesh tubes as a microorganism support.

EP 0 164 508 B1 describes a ribbon-like support material suspended over the length of a septic tank. A support frame is provided for this purpose and the individual ribbon-like woven textile support materials are individually fastened to this. The ribbon-like contact materials can be raised or lowered using the support frame. They are fastened at the bottom to a common annular body.

EP 0 159 535 B1 describes the use of ribbon-like support materials for microorganisms in wastewater purification plants. These ribbon-like support materials are laid around upper and lower supports of a tenter frame and lowered therewith into the wastewater tank. The material is a catalytically active material that is laid in loops. In combination with the feed of oxygen underneath the frame, this material brings about catalytic oxidation and thus purification of the wastewater on the support material.

Moreover, a method and a device for anaerobic wastewater purification is known from DE 36 07 520 A1. In this method and device, additional woven material is placed in the reaction chamber (digestion chamber) alternately at two different heights to create additional colonisation surfaces, in order to increase the biomass available for anaerobic breakdown of the organic impurities contained in the water.

A wastewater purification device comprising at least one textile material as a support material for colonisation with microorganisms or as a catalytic material for aerobic or anaerobic wastewater purification, which device is suitable for suspension in a tank filled with wastewater for treatment, is known from DE 197 30 839 C2. The textile material consists of strip-like or cord-like colonisation strips which are arranged next to each other and either have fastening lugs at the top or are laid around a support frame and are weighted down or fastened at the bottom. Sleeves or holding loops are distributed at an equal height over the length of the colonisation strips for receiving at least one additional weighting, fixing and/or holding bar that can be inserted transversely, at least one of the additional bars being coupled with a motion generating device.

Furthermore, a textile material for use in a biological purification plant using in particular fibrous or looped effect material, is known from DE 101 32 546 C1, a substrate structure that is independent in terms of mechanical load-bearing capacity being provided in the longitudinal direction of the textile material alongside the effect material. The patent also describes a support device for inserting and suspending in a wastewater treatment reactor, comprising a textile material of said type and a mount, a substantially stable frame being provided as said mount. Here, the textile material is resilient, in particular suspended on the frame by means of resilient or movable elements, the resilient elements being movable in a positive manner.

Microorganism colonisation bodies made of flexible, ribbon-like material floating in the wastewater are known from DE 197 53 707 A1. These have floats, which allow the colonisation bodies to float in the wastewater. The colonisation bodies are fastened to a tubular ring, which is connected to an air inlet line and has injector nozzles for discharging air.

An immersed fixed bed for the biological treatment of fluids, consisting of strips of continuous plastics film is known from DE 199 47 517 A1. The strips hang down from a support device and are preferably of a continuous design. The strips are stretched out so that the fixed bed behaves like a fixed bed made of solid blocks of mesh tubes.

DE 295 21 504 U1 discloses an aeration device for wastewater treatment plants having an immersed fixed bed, comprising at least one aeration head which has a plurality of air outlet nozzles to feed the air underneath the immersed fixed bed and is suitable for installation underneath or alongside the immersed fixed bed.

Amongst the known fixed beds of said types there are aeration devices that serve to input gas or air into the reactor to supply the support material and microorganisms or the support materials having catalysts with oxygen or other gases as part of the purification process.

A prerequisite for ensuring efficient purification by a fixed bed in a wastewater treatment plant is optimum aeration or, in other processes and where special microorganisms are used, the continuous supply of special gases or even the addition of liquids as nutrient solutions or the addition of chemically active additives, e.g. to precipitate certain substances. DE 103 43 743 B4 demonstrates that an adequate quantity of additives can be added to fixed bed reactors.

The disadvantage of the fixed bed described at the outset or of the other embodiments is that they can only be fitted with the corresponding textile material at the installation site, namely where the fixed bed or fixed beds is/are to be installed in a wastewater tank or reactor. Also, as can be seen from DE 103 43 743 B4, assembly of the fixed bed apparatus, that is the frame construction, is very complex. First of all, the entire frame structure has to be put together in situ. Furthermore, the textile microorganism supports are delivered separately and have to be manually suspended or anchored in the assembled frame on the installation site. Depending upon size, this can be very costly on site and can lead to unwanted contamination. Moreover, the overall frame, in which the textiles are arranged, is delivered disassembled and all the parts have to be put together before the textiles serving as colonisation supports can be inserted into the assembled frame.

Based on the described prior art, the object of the invention is to design a generic fixed bed in such a way that all parts of the fixed bed can be assembled to form a relatively small packaging unit, that this unit already contains the inserted textiles and that the fixed bed can be quickly and easily assembled at the site of operation.

The object is achieved by configuring the fixed bed according to the technical teaching in claim 1. Advantageous developments of the invention are described in detail in the sub claims.

According to the invention, the frames of a generic fixed bed are provided with spacers at least in the corner regions, the height of said spacers corresponding to the material height of the folded supports between two frames, and the supports being fixed to the side rails and/or intermediate rails of the frame by means of the support elements in a pre-assembly step prior to folding.

In addition, lateral mounting elements or columns that can be inserted into vertical through bearings in or on the spacers are provided and these enable the frame to be raised out of a position forming a stacked packaging unit into an operating position by attaching the lateral mounting elements or by inserting long columns into the through bearings and to then be inserted into a wastewater tank. These mounting elements serve for fastening all horizontal frames for the textile supports, or also for inserting an aeration frame, to which aeration elements are fastened, underneath the lower frame, in order to be able to feed air or a gas to promote microorganism colonisation and decomposition of harmful substances by the microorganisms. Such an aeration frame can, of course, be included in the packaging unit and comprise the same spacing means as the other frames.

If the fixed bed only has an upper frame and a lower frame, between which the textiles are stretched, then it is sufficient for one of the frames to be provided with tubular spacers projecting upwards or downwards, so as to determine the spacing between the two frames in the packaged state.

However, if the frame is to be reinforced in the corner regions, e.g. by means of triangular reinforcing plates, it is recommended that spacers of a defined height be provided in the corner region on the underside of the upper frame projecting downwards and spacers projecting upwards be provided on the frame below in a congruent arrangement, so as to minimise the size of the reinforcing plates. The spacing between two frames is defined by the overall height of the superposed spacers. The stacked fixed bed can be fastened to and transported on a pallet. Transport securing devices such as nets or film wrapping secure the connection. Of course, other fastening elements can additionally be provided.

However, since fixed beds can be over three meters in height, it is frequently desirable to relieve the pressure over the length of the textiles by means of intermediate frames and inserted support elements. It is recommended that one or more intermediate frames be provided in such cases. These intermediate frames can equally have spacers on one side or on both sides, that is on top and underneath in the corner regions, which, together with the frames thereabove or therebelow, form the storage space for the folded textiles. If the corners are reinforced by triangular plates, the height of the spacers can again be halved so that two spacers joined together define the nominal clearance between adjacent frames. Ultimately this clearance depends upon the choice of textile as a microorganism support. If it is a thick or tubular support, it is evident that, if there is only a small gap between adjacent suspended textiles, then a greater folding height is required and therefore the spacing between the frames must be adapted accordingly, in order to be able to store the folded supports in the gap. The cavity between adjacent frames is completely filled by the folded textiles portions. It is also apparent that the frames with the textiles form a shipping unit, which can easily be placed on a transport pallet and shipped or transported, it being possible for the frame area to correspond to the intended application, e.g. 4 $m^2$. The package also comprises lateral mounting elements, which can, for example, comprise a frame structure, to allow the frames to be screwed onto them at a defined height and at large intervals. For this purpose such lateral frames also comprise straps or flanges, which can be arranged on the frame congruent to the reinforcement plates. If congruent holes are additionally provided in the plates, these can be connected by means of screws. It is self-evident that the entire frame and also the plates are to be made of stainless steel, because, as a rule, they come into contact with aggressive wastewater. However, frames and columns made of plastics material or covered with plastics material can also be used. A lateral frame of this type, which serves as a mounting element, is placed on top of the upper frame of the fixed bed during transport, as a folding frame for example, and can be removed and unfolded or put together and used as a mounting element for the frames to be expanded for the textiles. A mounting frame or a lateral frame can therefore be used as a mounting element. Two such frames are attached on the opposite sides of the horizontal frame and, for example, screwed or riveted on the spacers and/or reinforcing elements.

It has proved particularly advantageous to provide vertical receptacles for columns at least in the corner regions of the frame, said vertical receptacles having a minimum length corresponding to the width of the spacing between the upper and lower frame, and being capable of being inserted into the columns. After the frame has been fitted with the textile supports, the upper frame is lowered towards the frame positioned therebelow, the support materials folding at the same time, and—after removal of the columns or insertion of shorter columns—forms a compact shipping unit with this frame.

At the assembly point, the long columns or extensions are placed on the shorter ones and the frames raised into position. In the raised state the frames are fixed to the columns, whilst the lower frame serves as a weighting frame for the supports and slides on the columns or can be fixed to the columns when the supports are tensioned. Clearly such a construction has the advantage that the receptacles on the frame can be interconnected via columns even in the stacked state. In one configuration these columns can be extended after transport by mounted column portions or replaced by long columns. In the former case, a connection must be made between the mounted column portion and the existing column portion already inserted. The upper horizontal frame and any intermediate frames that are provided can be slid onto the long columns thus formed and positioned at the desired height.

Drill holes, for example, can also be made in the columns so that it is possible to secure the height of the horizontal frame by means of inserted pins. The lower frame can be arranged as a free-moving weighting frame but can also be pressed downwards to stretch the textile. In this case, the height can be set as required by providing a corresponding row of holes in the wall of the columns.

In principle, the feed of air to a wastewater tank can be separate from the fixed bed. However, it is also possible, as we know, to provide aeration directly underneath the fixed bed. In a further embodiment of the invention, the aeration elements are provided in an aeration frame, which is attached underneath the lower horizontal frame. The aeration frame should have the same dimensions as the frames for the textiles thereabove, so that this can also form a direct connection with the aeration frame and the spacing can be set so as to achieve optimum aeration of the curtains e.g. by means of the columns or the lateral mounting elements. Where columns arranged in the corner regions are used to create the spaces between the horizontal frames, these columns can also be inserted through the receptacles on the aeration frame and mounted on the base to provide a spacing from the base. The aeration frame can then be fastened at a defined height from the base by means of fastening elements, for example a bolt. Of course, a lateral frame used as a mounting element can also be provided with feet and e.g. be fastened to the spacers of both the aeration frame and also the horizontal frame.

In order to be able to attach additional fixtures or hooks or lugs for a lifting apparatus, the columns or side frames, which serve as mounting elements, should project above the upper frame after the horizontal frames have been fixed on. This allows coupling pieces, such as hooks, lugs or spacers, to be attached thereto for connecting to columns or adjacent fixed beds. This projection is also an advantage if short columns are used for transport or long columns or extensions are used when the fixed beds are in the assembled state.

It is evident that, where columns are used, it is only necessary to extend the columns in situ or replace them with long columns to be able to slide the horizontal frames up these columns, the folded textile material unfurling at the same time. The design allows such a simple assembly that it can be achieved in an extremely short time and at little cost and can be achieved with a lifting apparatus, for example a truck-mounted crane, without having to join the parts together, since the basic design merely requires them to be pulled apart and, for example, automatic locking of the horizontal frames at the corresponding heights can also be provided. However, the textile material is also stretched out at the same time.

Obviously the lugs or hooks for the lifting apparatus can be fastened to the upper frame, for example to the side rails or end rails. However, it is recommended that they be provided directly on the columns or as an extension thereof. Clearly, spacers and fastening brackets can also be attached to the frames or also to the columns. If the columns are designed as square tubing, these spacers and fastening brackets can for example be placed on and they are non-rotatably mounted and can thus be used as wall spacers, for example. These can also be hook-shaped, for example, so that they can be suspended in a wall lug, thus creating a defined distance of the fixed bed inside a wastewater tank relative to the side wall and at the same time ensuring a stable position. Of course, connecting elements can also be provided and arranged in the same way between a fixed bed and a second fixed bed adjacent thereto, thus also allowing a solid connection to be made between two adjacent fixed beds.

If tubular columns are used, these can consist of a tubular profile and be connected at the lower end with the aeration elements of the aeration frame. The requisite compressed air is then fed to the aeration elements via the hollow profile columns or one of these columns through a header on the underside, so that the air can be fed into the wastewater tank as required, without having to lay special conduits to the aeration elements. Such columns, which also serve as air supply columns for the aeration elements, can also have openings in the form of small holes extending inwards into the fixed bed, through which air can also exit when injected to provide an additional supply of oxygen to the microorganisms responsible for wastewater purification and which colonise or are colonised on the textiles.

Non-degradable cord-like, ribbon-like or tubular textiles or a broadcloth with interwoven individual tubes—arranged in series or in groups—can be used as supports for the organisms. However, woven surfaces can also be used in a tube system of nested textile tubes, it being possible for the woven tubes to be being aerated. Preferably a broadcloth of colonisation strips for microorganisms, combined with spacer strips to separate them, can be used. All textile support materials, which are also mentioned in DE 103 43 743 B4 and in DE 101 32 546 01, can be used.

In order to be able to fasten the horizontal frames of the textile material to the support elements, lugs can be attached to them to draw in the support elements. The textiles, in particular the broadcloth, can also be arranged and sewn to create lugs at the sides, which are then pulled upwards on the support elements. This pulling-up process can be performed by robots as part of pre-assembly in the factory.

The support elements can also comprise interconnectable profile strips. When these are put together, the support materials are clamped or, when the profile strips are welded, the support materials can be welded therewith. Particularly if broadcloths consisting of plastics fibres are used, it is possible to attach such a fastening element mechanically. If corresponding latches are provided, this can be done by interlocking the profile strips and simultaneously clamping the broadcloth. If the profile strips are made of plastics material, they can also be designed so that they can be welded together at certain points. Individual fibres of the broadcloth can also be welded in during this process or the weld points are arranged so that the broadcloth is only held by clamping. It goes without saying that the receptacles in the side rails and the intermediate rail are to be formed so that the support elements consisting of profile strips can be fastened thereto.

In order to allow simplified assembly during pre-assembly of the textiles, a further configuration is provided, in which C-profiles are provided as support elements, arranged in parallel in the horizontal frames. Holders with correspondingly shaped heads can be movably inserted into these C-profiles. These holders support fastening strips, which interconnect the textiles at the top. These fastening strips can for example comprise two interconnectable profile strips which can be permanently or detachably interconnected and which clamp the support material when they are connected. There are many different variants for this.

Since the curtains are very heavy—relative to their length of three or more meters—the profile strips should be screwed together or clamped together by clamping elements. However, it is also possible to clamp the textile cloth between two profile strips and weld the two profile strips together, during which process the inserted portions of the textiles simultaneously interlock therewith. In order to now be able to hold such profile strips simply in the C-profiles by means of holders, the profile strips should have a dovetailed or C-shaped longitudinal profile so that the holders can be inserted into this profile with a holding plate. The fastening strips can extend parallel to the C-supports or also at right angles thereto so that they extend transverse to the support elements. In each case this depends upon the design of the holder and the arrangement of the fastening strips.

The profile strips can be made of plastics material so that they can be welded together, as already described above. However, latching elements, which allow the two profile strips to latch together whilst clamping the textiles, can also be provided. When the supports are changed, these profile strips can be reused. To this end, the profile strips can also have interlocking grid patterns of various structures.

Figure 2:
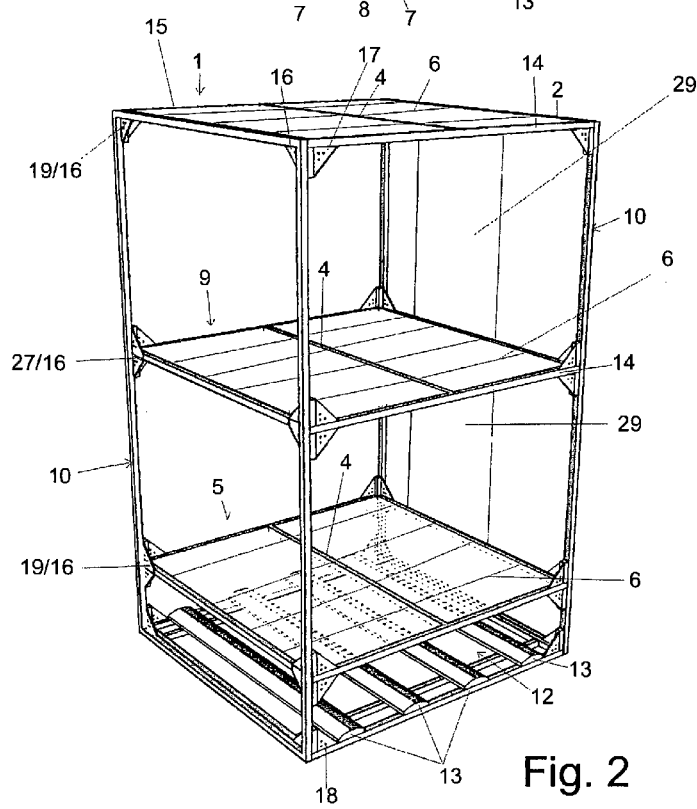
Figure 3:
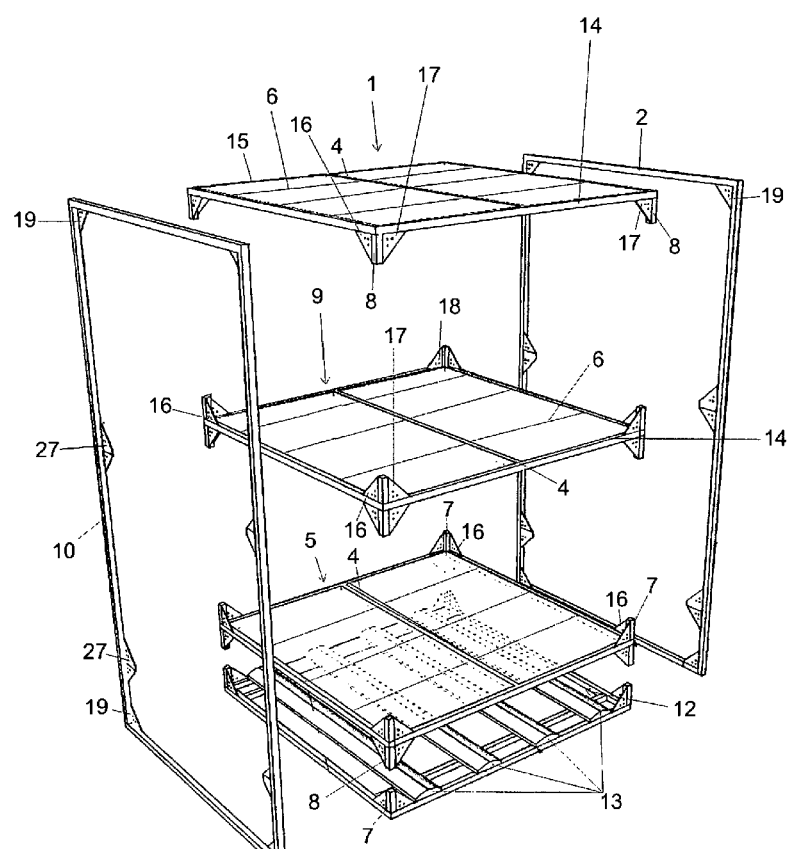
Figure 4:
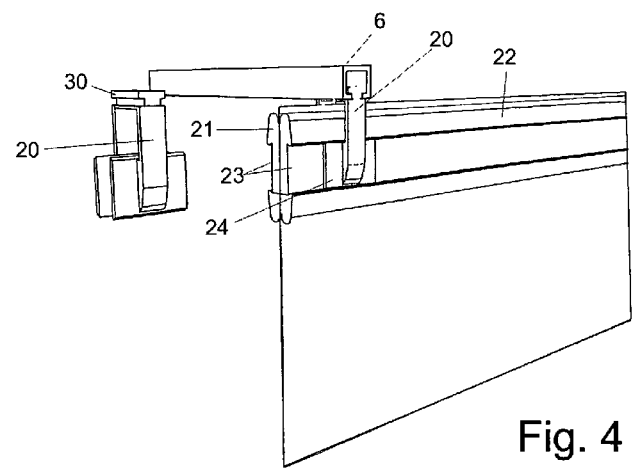
Figure 5:
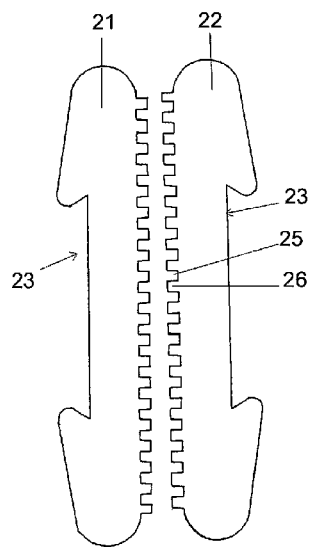

The invention is explained in further detail below with reference to the embodiment shown in the drawings, in which:

FIG. 1 shows a fixed bed according to the invention as a packaging unit without the flexible support material, FIG. 2 shows the fixed bed shown as a packing unit in FIG. 1 in the assembled state for inserting into a wastewater tank, FIG. 3 is an exploded drawing of the fixed bed from FIG. 2 in the disassembled state, FIG. 4 is a perspective drawing of fastening strips for a non-degradable textile support, suspended in a support element, with a holder shown offset thereto, and FIG. 5 shows two interconnectable fastening strips The embodiment of a fixed bed according to the invention shown in FIGS. 1 to 3 comprises an upper horizontal frame 1 with side rails 2, 3 and end rails 14, 15. The frame 1 can be square, for example, and have a side rail length of two meters. The frame 1 is divided by an intermediate rail 4. The intermediate rail 4 and the side rails 2, 3 have bearing points, e.g. U-shaped bearing points, to receive support elements 6. Textile supports 29 for colonisation with microorganisms are fastened to these support elements 6, as can be seen in FIG. 2. FIG. 2 only shows a single piece of broadcloth, by way of an example.

Underneath the upper frame 1 there is an intermediate frame 9, which has the same frame structure as the upper frame 1 and is similarly equipped with support elements 6, in order, for example, to be able to fasten the support 29 thereto by means of attached lugs. Underneath the intermediate frame 9 there is a further lower frame 5, which has the same structure as frames 1 and 9 thereabove and is similarly equipped with support elements 6, which preferably engage in the frame from the underside where they are mounted in recesses in the intermediate rail 4 and the side rails 2, 3. Underneath the lower frame 5 there is an aeration frame 12, onto which aeration elements 13 comprising nozzles are fastened extending in the longitudinal direction of the fixed bed.

FIG. 1 shows a stack of said frames 1, 9, 5 and 12 placed on a pallet 28 to form a shipping unit. The special feature lies in the fact that the frames 1, 5, 9 and 12 are stacked at specific intervals one on top of the other. The intervals are created by the spacers 7, 8 attached in the corner regions of the side and end rails 2, 3, 14, 15 standing on top of each other. In the embodiment shown these are square profile tubes. Triangular reinforcements 16, 17 which have holes 18 are provided between the spacers 7, 8 and the corresponding rails to stabilise the spacers 7, 8 and to connect to the respective frames 1, 5, 9 or 12. Each frame 1, 9, 5 has a foot formed in this way. The intermediate frame 9 and also the lower frame 5 not only have spacers projecting downwards but also spacers projecting upwards, which, together with the spacers 7, 8 of the adjacent frame, create the spacing between two frames 1 and 9 or 9 and 5 and 5 and 12. This spacing is necessary to allow the preassembled textile support materials for colonisation with microorganisms to be inserted into the gaps by folding them into the packaging units, as shown in FIG. 1, after the pre-assembly step. The support material, not shown in FIG. 1, for example the support 29 shown in FIG. 2, which can be provided in many parallel arrangements or can also be differently designed, is folded into the gaps and is an integral part of the stack. Columns 11 are inserted into the spacers 7, 8 in the corner regions to create a secure connection between the assembled stacked frames 1, 5, 9 and 12 so that a package prepared in this way can be transported to the installation site using a pallet 28. All that is required at the installation site is to create the required height intervals of the frames 1, 5, 9 and 12 so that the supports 29 can unfurl. Said supports can also be tautened by weighting means.

One can see from FIG. 1 that it is very simple to alter the spacing between the frames 1, 9; 9, 5 by extending the columns 11 by the amount required to configure the fixed bed so that the support materials 29 for colonisation can unfurl in the fixed bed. The extension columns required for this can also be delivered in the packaging unit and be placed, for example, on top of the upper frame 1. They are then placed onto the projecting ends of the columns 11 and fastened to them so that the frame 1 can be pushed upwards. The added extension columns have holes so that they can be fixed at a defined height to allow the frames 1, 9 to be fixed at a given height by bolts. Similarly, with a corresponding arrangement of fixing holes or blind holes in the column 11, the lower frame 5 can also be pushed upwards and secured to said column. However, it is advantageous to leave the lower frame sliding freely on the columns 11, so that said lower frame can act as a weighting frame and tauten the supports 29. At the lowest level are the aeration frames 12 comprising the aeration elements 13, which have nozzles to be able to introduce into the wastewater tank air or oxygen or other gases required to provide the microorganisms with the appropriate essential gases for aerobic or anaerobic wastewater purification. If hollow columns 11 are used for the structure, at least one of the columns can be used for feeding air to the aeration elements. In order to do this the aeration elements 13 must be connected to the column pressurised by compressed air by means of connecting conduits.

In order to now be able to insert an assembled fixed bed properly into a wastewater tank or tank, hooks or lugs can be provided at the upper ends of the columns so that the fixed bed, which, for example, has a height of three meters, can be transferred accordingly using a lifting apparatus. It goes without saying that the transport securing devices on the pallet 28 first of all have to be removed before said pallet can be lifted off. The exploded drawing in FIG. 3 shows the individual frames and additionally lateral mounting elements 10 instead of columns 11, said mounting elements having a rectangular frame structure and being provided with flanges 27 and corner flanges 19, to which the reinforcing elements 16 can be screwed. The height intervals between the frames 1, 5, 9 and 12 are defined by the definition of the flange 27 and corner flange 19. The mounting element 10 should be collapsible in the middle by means of swivel hinges so that it can also be added to the shipping unit according to FIG. 1. During assembly, the mounting elements can be attached to the sides, for example. To do this the upper frame 1 is lifted up and screwed on the upper corner flanges 19 with the reinforcing elements 16, congruent holes being provided in the reinforcements 16 and 17 and in the corner flanges 19 for this purpose. The intermediate frame 9 is screwed onto the flange 27 therebelow, the lower frame 5 onto the frame therebelow and finally the aeration frame 12 to the corner flanges 19 provided at the bottom. This is also a potentially simple way of assembling the prefabricated fixed bed, because the textile support materials unfurl as the frames are being fastened. During assembly the frames are lifted up by a crane or another lifting apparatus and interconnected via the supports. Of course, hooks or lugs can be fastened at the top of the lateral mounting elements 10, in the same way as on the side rails 2, 3 and end rails 4, 5 of the upper frame 1, in order to be able to fasten the lifting apparatus thereto for transfer.

FIG. 4 shows an example of how a broadcloth 29 can easily be mounted on a support element 6 provided on top of the upper frame 1. To this end, the support 29, which is a broadcloth, is laid between two fastening strips 21, 22, which are plastics profile strips. These fastening strips 21, 22 have dovetailed longitudinal receptacles 23, into which holding plates 24 can be inserted on a U-shaped holder. This provides a secure form-locked sliding connection. As can be seen from FIG. 5, the two fastening strips 21, 22 comprise opposing grooves 25 and peaks 26, which are designed to press into each other, thereby clamping the broadcloth therein. However, the grooving can merely be used to absorb the fusion heat more rapidly if the two fastening strips are welded together and the supports may only be heated at certain points. These fastening strips 21, 22 provided with rounded closures do not create a tear-off edge and the broadcloth, prefabricated with the fastening strips and the pushed-on holder 20, can easily be fixed on the support element 6 by inserting the T-support 30 provided on the head into the C-profile. This also saves a lot of time during assembly.

A fixed bed prefabricated in a factory is shipped stacked together with the folded textile support materials to form a packaging unit and then only needs to be expanded at the installation site, the frames being fixed at their heights. This dispenses with the need for costly assembly units at the installation site and the manufacturing process in the factory can also easily be automated. Moreover, it is also possible to replace the supports easily after a long period of use, since a replacement fixed bed can quickly be installed and the used support material replaced with new supports in a factory, reusing the frame components. A replacement fixed bed built in this way can then be reused. Environmentally safe disposal of the used supports is also assured.

The invention claimed is:

1. Fixed bed for aerobic or anaerobic wastewater purification, at least comprising a first frame (1) having a first support element (6) having opposite side rails (2, 3) and/or intermediate rails (4) capable of fastening textile supports for microorganisms, a second frame (5) having a second support element (6) capable of fixing the textile supports to the second frame and means connecting the first and second frames (1, 5) at least in a corner region of the first and second frames, characterised in that the first and second frames (1, 5) are provided with spacers (7, 8) at least in the corner regions, the height of said spacers corresponding to the height of the textile supports as fastened between two frames (1, 5), where the textile supports are fixed to the side rails (2, 3) and/or intermediate rails (4) of the first and second frames by means of the first and second support elements (6), in that the means are one of lateral mounting elements (10) or columns (11), the columns insertable into through-bearings in or on the spacers (7, 8), and in that the frames can be assembled by joining the lateral mounting elements (10) or by inserting long columns (11) into the through-bearings, and the fixed bed can be inserted into a wastewater tank.

2. Fixed bed according to claim 1, characterised in that mounting frames can be laterally attached at least on the opposite sides of the first and second frames (1, 5) as mounting elements (10) and connected to the spacers (7, 8), reinforcements (16, 17) or the side rails (2, 3) of the first and second frames.

3. Fixed bed according to claim 1, characterised in that receptacles for columns (11) are provided at least in the corner regions of the first and second frames (1, 5), which columns (11) are at least as long as the width of the spacing between the first and second frames (1, 5), in that the columns (11) can be inserted continuously into the receptacles, in that, after the first and second frames have been fitted with the textile support (29), the first frame (1) can be lowered towards the second frame therebelow (5) with simultaneous folding of the textile supports (29) and, after removing the columns (11) or inserting shorter columns (11), can form a compact stacked shipping unit with said textile supports (29), in that, after inserting longer columns or placing on column extensions, the height of the first frame (1) can be adjusted upwards at the installation site and in that the first frame (1) can be fixed to the long columns (11), whilst the second frame (5) serves as a weighting frame of the textile supports (29) and slides on the columns (11) or can be fixed to the columns (11) in a position where the textile supports (29) are stretched taut.

4. Fixed bed according to claim 1, characterised in that the columns (11) are separable columns (11) and comprise a first portion, which extends for a length at least greater than the combined height of the spacers (7, 8) and the rails (2, 3) of the frames, and an extension portion that can be connected or telescopically connected thereto and which can be fastened to the respective first portion.

5. Fixed bed according to claim 1, characterised in that at least one intermediate frame (9) is interposed between the first frame (1) and the second frame (5).

6. Fixed bed according to claim 1, characterised in that an aeration frame (12) having aeration elements (13) is arranged underneath the second frame (5).

7. Fixed bed according to claim 6, characterised in that the columns (11) can be inserted through receptacles on spacers (7) on the aeration frame (12) to create a spacing to the base and in that the aeration frame (12) can be fastened to one of the columns (11) or mounting elements (10), the mounting elements (10) having feet that can be fastened to the spacers (7).

8. Fixed bed according to claim 1, characterised in that the mounting elements (10) or columns (11) protrude above the first frame (1) after the first and second frames have been fixed thereto.

9. Fixed bed according to claim 1, characterised in that lugs or hooks are fastened to the top side of the mounting elements (10), the columns (11) or on end rails (14, 15) of the first frame (1), to which lugs or hooks a lifting apparatus can be fastened.

10. Fixed bed according to claim 9, characterised in that wall spacers can be fastened to at least one of the side and end rails (2, 3, 4, 14, 15) of the first frame (1) or to at least one of the mounting elements (10), or the columns (11), to position the fixed bed in a wastewater tank, where connecting elements can be fastened for fastening the fixed bed to a parallel-mounted fixed bed in the wastewater tank.

11. Fixed bed according to claim 1, characterised in that triangular reinforcements (16, 17) are provided for the spacers (7, 8) in the corner regions on the side and end rails (2, 3, 14, 15) of the first and second frames.

12. Fixed bed according to claim 11, characterised in that the the spacers (7, 8) are attached between the first and second frames to the top side of the second frame and bottom side of the first frame.

13. Fixed bed according to claim 11, characterised in that the triangular reinforcements (16, 17) are perforated with holes (18), to which holes at least one mounting element (10) having attached corner flanges (19) and side flanges (27) can be fastened.

14. Fixed bed according to claim 1, characterised in that the columns (11) are hollow profile columns that can be connected to aeration elements (13) on the bottom and have compressed air inlets on top.

15. Fixed bed according to claim 14, characterised in that the columns (11) are provided with holes in an open space formed between the first and second frames, through which holes air or gas can be introduced into the wastewater tank.

16. Fixed bed according to claim 1, characterised in that the textile support (29) is made of non-degradable material and is a cord-like, ribbon-like or tubular textile or a broadcloth with interwoven textile tubes and/or comprises individual textile tubes or textile tubes arranged in groups or nested textile tubes or is a broadcloth consisting of colonisation strips for microorganisms and spacer strips separating these from each other.

17. Fixed bed according to claim 16, characterised in that lugs are attached to the textile support (29) for drawing in the first and second support elements (6) or the textile support (29) is arranged and sewn to form lugs.

18. Fixed bed according to claim 16, characterised in that the first and second support elements (6) consist of interconnectable profile strips and when these are put together, the textile supports are clamped or, when the profile strips are welded, the textile supports can be welded therewith.

19. Fixed bed according to claim 16, characterised in that C-profiles or other rails are provided as support elements (6), onto which or into which holders (20) for fastening strips (21, 22) can be fastened and/or inserted with a T-profile or hook-like elements, the textile supports being fastened to said fastening strips (21, 22).

20. Fixed bed according to claim 19, characterised in that the fastening strips (21, 22) consist of two interconnectable profile strips, which can be permanently or detachably interconnected and which clamp the textile supports when connected.

21. Fixed bed according to claim 20, characterised in that the profile strips (21, 22) have longitudinal receptacles (23), into which a holding plate (24) on the holder (20) can be inserted.

22. Fixed bed according to claim 21, characterised in that the longitudinal receptacles (23) have a dovetailed or C-shaped profile.

23. Fixed bed according to claim 20, characterised in that the profile strips (21, 22) are made of plastics material, in that they have longitudinal comb structures with grooves (25) and peaks (26) that engage with said grooves on the corresponding profile strips or have an interlocking grid pattern (26) and in that the profiles can be pressed together and/or welded together after insertion of the textile supports.

* * * * *